US012542407B2

(12) United States Patent
Lan et al.

(10) Patent No.: US 12,542,407 B2
(45) Date of Patent: Feb. 3, 2026

(54) ELECTRICAL CONNECTOR WITH CONDUCTIVE TERMINALS HAVING IMPROVED STRUCTURE

(71) Applicant: Luxshare Precision Industry Company Limited, Shenzhen (CN)

(72) Inventors: Rongqin Lan, Shenzhen (CN); Min Fan, Shenzhen (CN); Zhiyong Li, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 447 days.

(21) Appl. No.: 18/100,444

(22) Filed: Jan. 23, 2023

(65) Prior Publication Data

US 2023/0246403 A1 Aug. 3, 2023

(30) Foreign Application Priority Data

Jan. 28, 2022 (CN) ......................... 202220243538.5

(51) Int. Cl.

*H01R 24/60* (2011.01)
*H01R 12/55* (2011.01)
*H01R 13/405* (2006.01)
*H01R 13/62* (2006.01)
*H01R 13/639* (2006.01)

(52) U.S. Cl.

CPC ............ *H01R 24/60* (2013.01); *H01R 12/55* (2013.01); *H01R 13/405* (2013.01); *H01R 13/6205* (2013.01); *H01R 13/639* (2013.01)

(58) Field of Classification Search

CPC H01R 12/55; H01R 13/2428; H01R 13/2442; H01R 13/405; H01R 13/6205; H01R 13/639; H01R 24/60

See application file for complete search history.

(56) References Cited

U.S. PATENT DOCUMENTS 7,481,677 B1 * 1/2009 Yi ...................... H01R 13/6485 439/541.5
11,621,527 B2 * 4/2023 Chen .................. H01R 13/6598 439/607.01
11,658,441 B2 * 5/2023 Li ........................ H01R 13/405 439/607.41
11,784,434 B2 * 10/2023 Yang .................... H05K 7/2039 439/607.23

(Continued)

FOREIGN PATENT DOCUMENTS

CN 202585860 U 12/2012

*Primary Examiner* — Abdullah A Riyami
*Assistant Examiner* — Thang H Nguyen
(74) *Attorney, Agent, or Firm* — Birch, Stewart, Kolasch & Birch, LLP

(57) ABSTRACT

An electrical connector includes an outer cover and a number of conductive terminals. The outer cover includes a mating surface. Each conductive terminal includes a first extension portion and a mating portion connected to the first extension portion. The mating portion extends toward the mating surface in a mating direction. Each conductive terminal further includes a curved portion connected to the first extension portion. The curved portion has at least one deformable curved structure along a first direction parallel to the mating direction. The deformable curved structure is configured to provide elastic force to the mating portion.

20 Claims, 13 Drawing Sheets

(56) References Cited

U.S. PATENT DOCUMENTS

| | | | | |
|---|---|---|---|---|
| 11,949,181 | B2 * | 4/2024 | Chen | H01R 12/716 |
| 11,984,688 | B2 * | 5/2024 | Chen | H01R 13/516 |
| 12,218,452 | B2 * | 2/2025 | Chen | H01R 12/737 |
| 2014/0322943 | A1 * | 10/2014 | Zhu | H01R 27/00<br>439/217 |
| 2014/0335738 | A1 * | 11/2014 | Chen | H01R 27/00<br>439/660 |
| 2022/0216650 | A1 * | 7/2022 | Chen | H01R 13/6598 |
| 2022/0352667 | A1 * | 11/2022 | Chen | H01R 12/727 |
| 2022/0384970 | A1 * | 12/2022 | Huang | H01R 13/6581 |

* cited by examiner

ELECTRICAL CONNECTOR WITH CONDUCTIVE TERMINALS HAVING IMPROVED STRUCTURE

CROSS-REFERENCE TO RELATED APPLICATION

This patent application claims priority of a Chinese Patent Application No. 202220243538.5, filed on Jan. 28, 2022 and titled "ELECTRICAL CONNECTOR", the entire content of which is incorporated herein by reference.

TECHNICAL FIELD

The present disclosure relates to an electrical connector, which belongs to a technical field of connectors.

BACKGROUND

Electrical connectors with Pogo terminals have been widely used in various fields (e.g., consumer electronics) to transmit data and/or access power. Pogo terminals typically include a body portion, a spring mounted in the body portion, and a contact portion mating with the spring. The spring can provide a contact force when the contact portion abuts against a mating terminal of a mating connector.

However, the Pogo terminal in the prior art has a relatively complex structure and high cost.

SUMMARY

An object of the present disclosure is to provide an electrical connector with conductive terminals having a simple structure.

In order to achieve the above object, the present disclosure adopts the following technical solution: an electrical connector, comprising: an outer cover comprising a mating surface; and a plurality of conductive terminals, each conductive terminal comprising a first extension portion and a mating portion connected to the first extension portion, the mating portion extending toward the mating surface along a mating direction; wherein each conductive terminal comprises a curved portion connected to the first extension portion, the curved portion has at least one deformable curved structure along a first direction parallel to the mating direction, and the deformable curved structure is configured to provide elastic force to the mating portion.

In order to achieve the above object, the present disclosure adopts the following technical solution: an electrical connector, comprising: an outer cover comprising a mating surface; a plurality of conductive terminals, each conductive terminal comprising a first extension portion, a mating portion connected to the first extension portion and a tail portion, the mating portion extending toward the mating surface along a mating direction; an adapter circuit board, the tail portion of each conductive terminal being electrically connected with the adapter circuit board; and a cable electrically connected with the adapter circuit board; wherein each conductive terminal comprises a curved portion connected to the first extension portion, the curved portion has at least one deformable curved structure along a first direction parallel to the mating direction, and the deformable curved structure is configured to provide elastic force to the mating portion.

Compared with the prior art, the conductive terminal of the present disclosure is provided with a curved portion. The curved portion has at least one deformable curved structure along a first direction parallel to the mating direction. The deformable curved structure is configured to provide elastic force to the mating portion. This arrangement simplifies the structure of the conductive terminals and reduces the cost.

DETAILED DESCRIPTION

Figure 1:
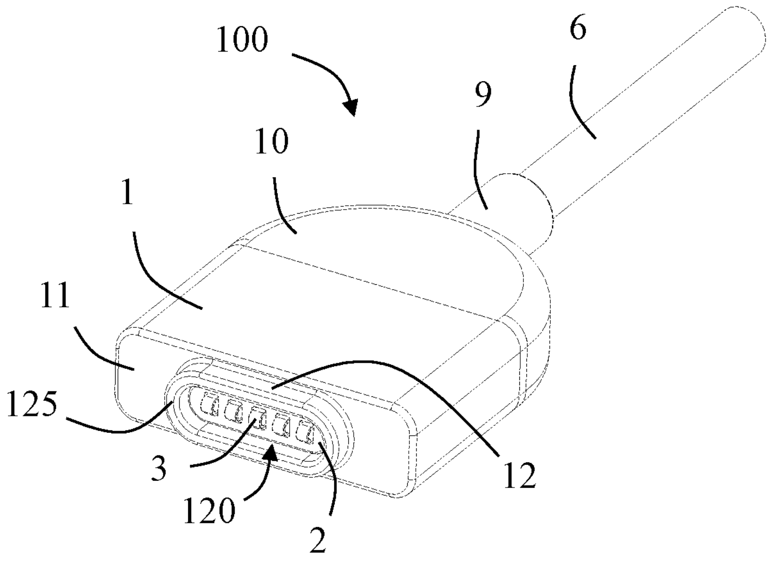
FIG. 1 is a schematic perspective view of an electrical connector in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 14, an embodiment of the present disclosure discloses an electrical connector 100 including an outer cover 1, an insulating body 2 at least partially installed in the outer cover 1, a plurality of conductive terminals 3 at least partially installed in the insulating body 2, an insulating block 4 for fixing the plurality of conductive terminals 3, an adapter circuit board 5 electrically connected with the plurality of conductive terminals 3, a cable 6 electrically connected to the adapter circuit board 5, an over-molding block 7 over-molded on the insulating block 4 and the adapter circuit board 5, a ring 8 sleeved on the cable 6, a stress relief block 9 mating with the cable 6, and an over-molding housing 10 over-molded on the over-molding block 7. The electrical connector 100 is adapted to mate with a mating connector 200 to transmit data and/or access power.

Referring to FIGS. 1 to 6, FIG. 13 and FIG. 14, the outer cover 1 is made of insulating material, conductive material or magnetic attraction material. In the embodiment shown in the present disclosure, the outer cover 1 includes an end surface 11 and a protrusion 12 protruding beyond the end surface 11. The protrusion 12 is provided with a mating surface 125 and a receiving space 120 extending through the mating surface 125. In the illustrated embodiment of the present disclosure, the protrusion 12 is elliptical, and includes a first straight side 121, a second straight side 122 opposite to the first straight side 121, a first arc-shaped portion 123 connecting one end of the first straight side 121 and one end of the second straight side 122, and a second arc-shaped portion 124 connecting the other end of the first straight side 121 and the other end of the second straight side 122. The protrusion 12 is symmetrical along a central plane M-M of the electrical connector 100. This design can realize positive and negative insertion in shape, that is, the electrical connector 100 can be inserted into the mating connector 200 regardless of whether the electrical connector 100 is facing upwardly or downwardly.

Figure 5:
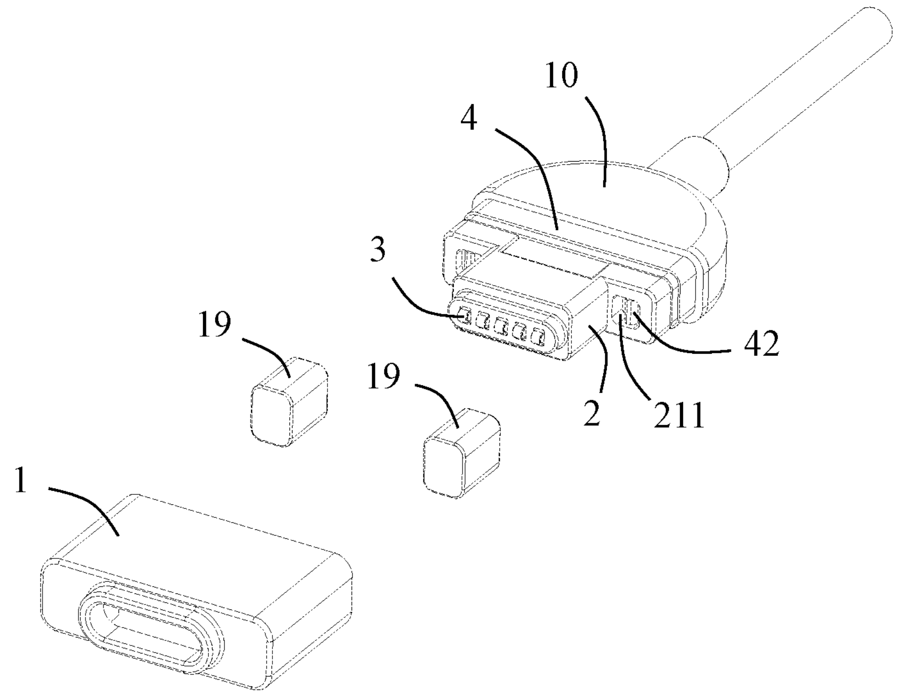
FIG. 5 is a further partially exploded perspective view of FIG. 4, wherein an outer cover and magnetic attraction elements are separated.
Figure 6:
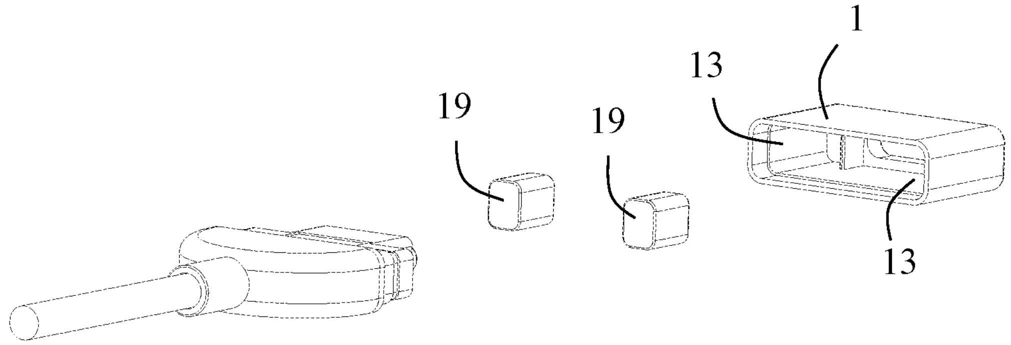
FIG. 6 is a partially exploded perspective view of FIG. 5 from another angle.

In the embodiment of the present disclosure, the electrical connector 100 is matched with the mating connector 200 through magnetic attraction. Referring to FIG. 5 and FIG. 6, in the embodiment shown in the present disclosure, the electrical connector 100 further includes at least one magnetic attraction element 19 installed in the outer cover 1. In the illustrated embodiment of the present disclosure, two magnetic attraction elements 19 are provided. Each magnetic attraction element 19 is a magnet or a magnetic attraction metal. The outer cover 1 is provided with a pair of accommodating cavities 13 for accommodating the magnetic attraction elements 19. Of course, in some embodiments, for example, when the outer cover 1 is made of the magnetic attraction material, the magnetic attraction element 19 can be omitted, and the purpose of matching with the mating connector 200 through magnetic attraction can also be achieved.

Figure 7:
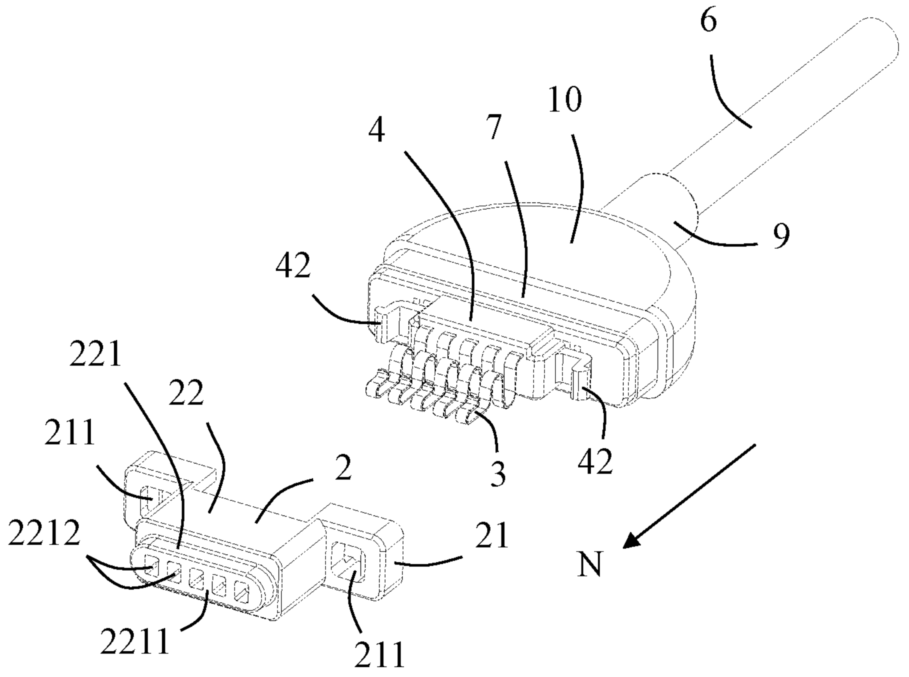
FIG. 7 is a further partial perspective exploded view after removing the outer cover and the magnetic attraction elements in FIG. 5.
Figure 8:
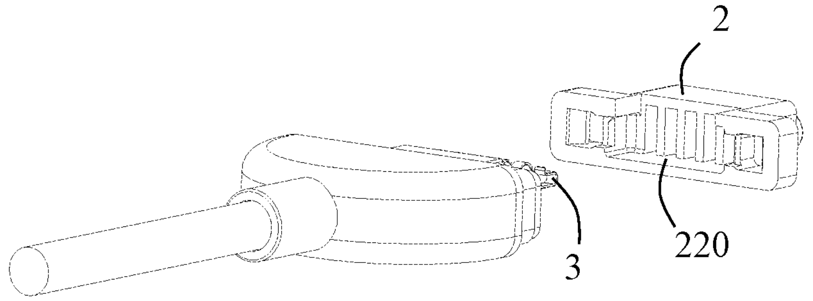
FIG. 8 is a partially exploded perspective view of FIG. 7 from another angle.

Referring to FIG. 7 and FIG. 8, the insulating body 2 includes a base portion 21 and a protruding portion 22 protruding from the base portion 21. In the illustrated embodiment of the present disclosure, the base portion 21 is provided with a pair of locking holes 211 located on opposite sides of the protruding portion 22, respectively. The protruding portion 22 includes a receiving cavity 220 and a boss portion 221 protruding along the mating direction N. An outer contour of the boss portion 221 is elliptical. The boss portion 221 is used to at least partially receive the protrusion 12. The boss portion 221 includes a front end surface 2211 and a plurality of terminal receiving grooves 2212 extending through the front end surface 2211. The plurality of terminal receiving grooves 2212 are in communication with the receiving cavity 220 for receiving the conductive terminals 3. The plurality of terminal receiving grooves 2212 are arranged at intervals along a direction perpendicular to the mating direction N (e.g., a left-right direction). The plurality of conductive terminals 3 are receiving in the receiving cavity 220 and extend through corresponding the terminal receiving grooves 2212. In an embodiment of the present disclosure, each magnetic attraction element 19 is located on one side of the protruding portion 22 and is located between the base portion 21 and an end surface of the outer cover 1 along the first direction C1-C1.

In an embodiment of the present disclosure, the plurality of conductive terminals 3 are insert-molded with the insulating block 4 to form a whole for easy assembly. Of course, it is understandable to those skilled in the art that the plurality of conductive terminals 3 can also be fixed to the insulating block 4 by means of assembly or the like.

Figure 9:
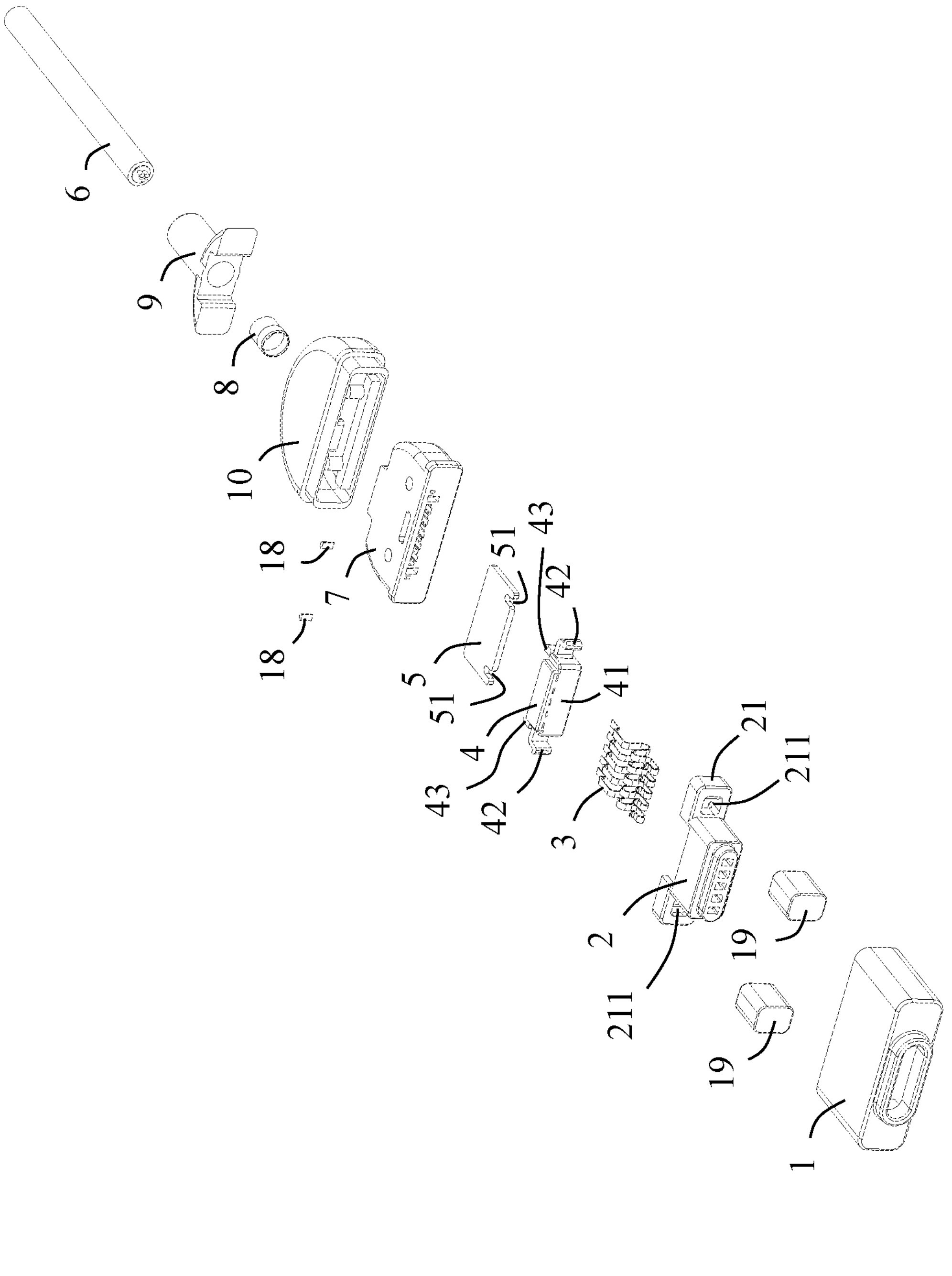
FIG. 9 is an exploded perspective view of the electrical connector of the present disclosure.
Figure 10:
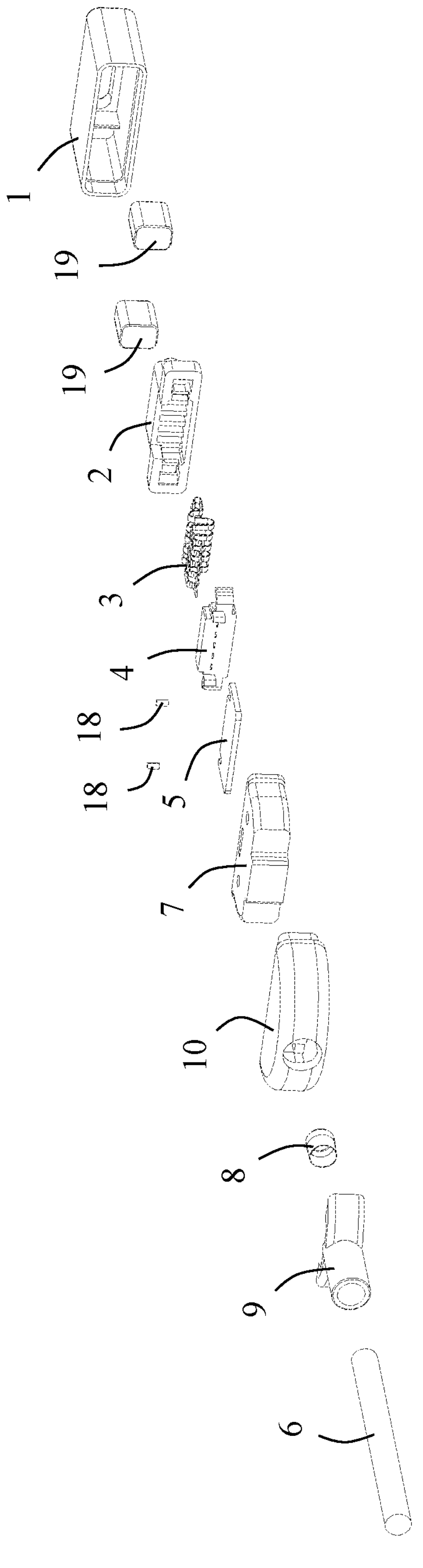
FIG. 10 is an exploded perspective view of FIG. 9 from another angle.
Figure 11:
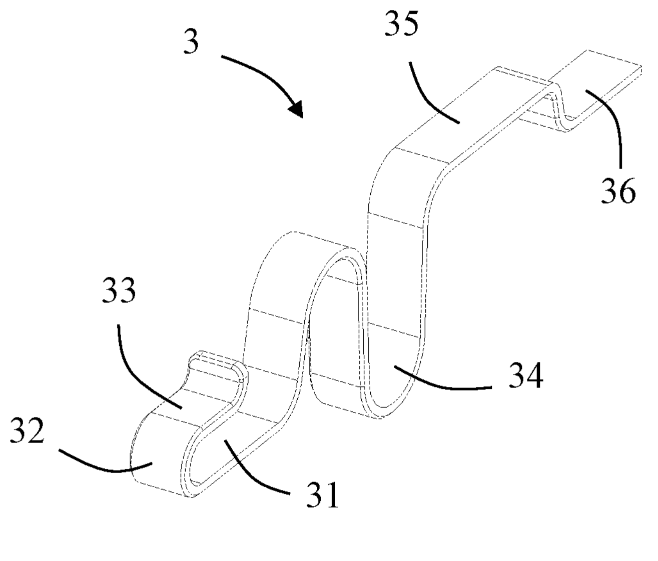
FIG. 11 is a schematic perspective view of a conductive terminal in FIG. 9.
Figure 12:
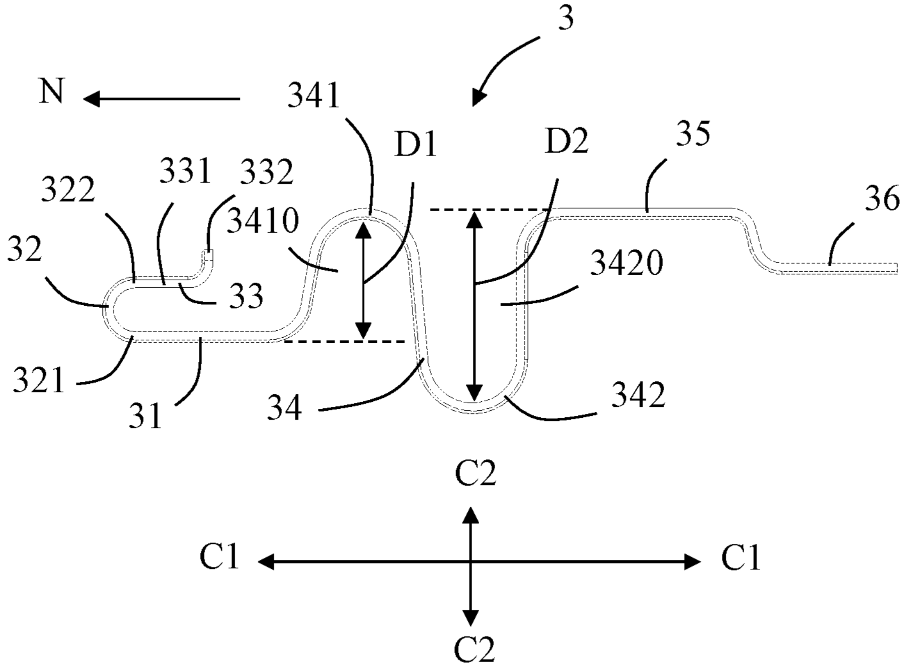
FIG. 12 is a right side view of FIG. 11.
Figure 13:
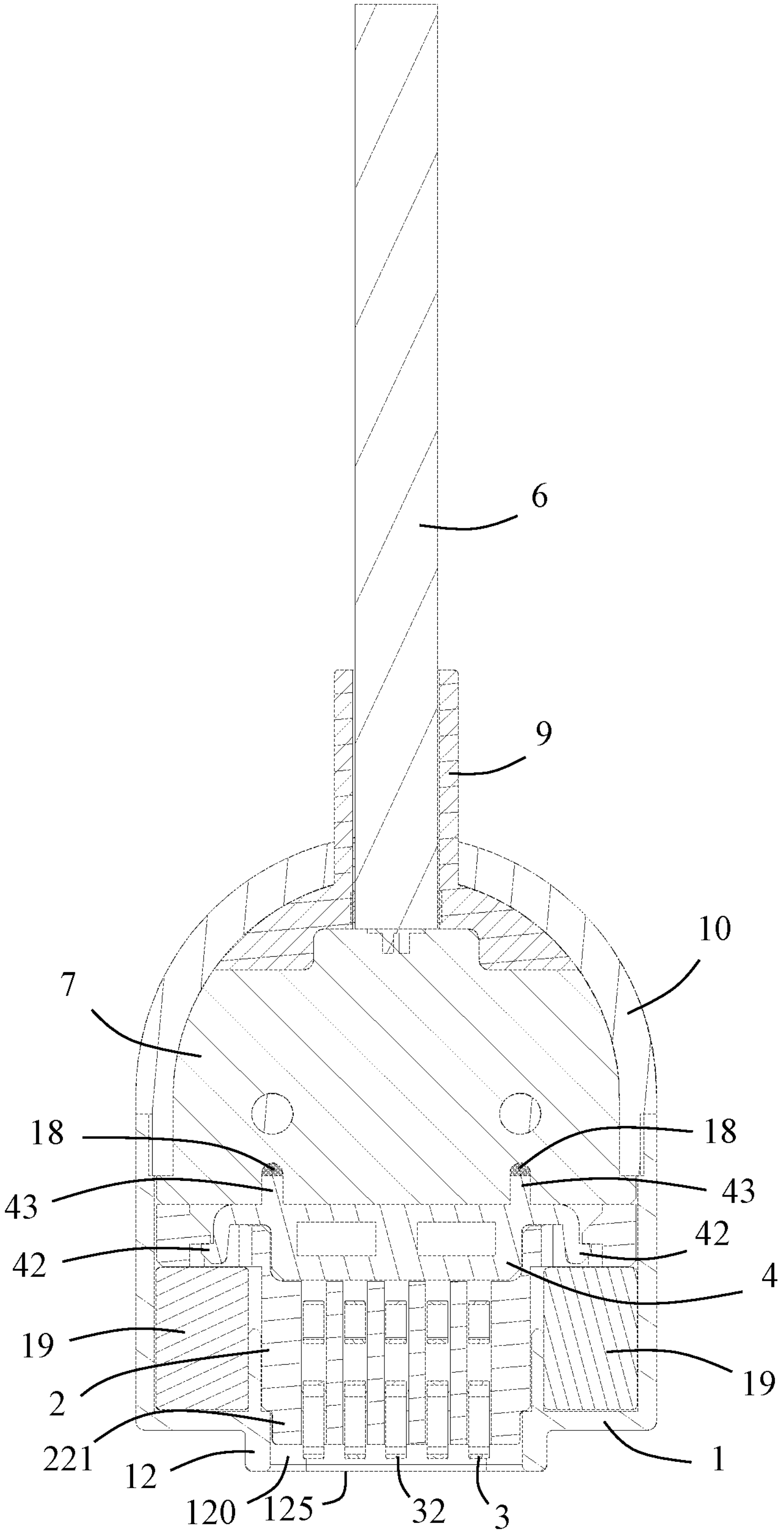
FIG. 13 is a schematic cross-sectional view taken along line A-A in FIG. 2.
Figure 14:
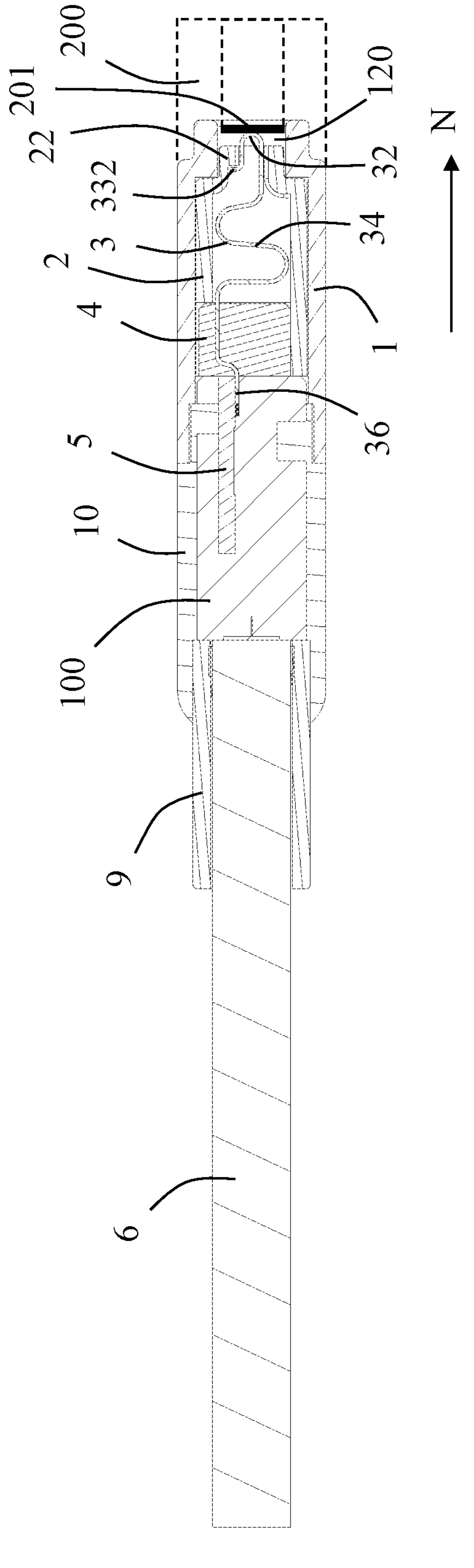
FIG. 14 is a schematic cross-sectional view along line B-B in FIG. 2, and schematically depicts a mating connector for mating with the electrical connector.

Referring to FIGS. 9, 13 and 14, in the embodiment illustrated in the present disclosure, the insulating block 4 includes a body portion 41, a pair of locking arms 42 protruding from the body portion 41 along the mating direction N from both sides, and a pair of positioning tabs 43 protruding from the body portion 41 in a direction opposite to the mating direction N. The locking arms 42 are locked with the locking holes 211 to realize the assembly and fixation of the insulating block 4 and the insulating body 2. In the embodiment shown in the present disclosure, the insulating body 2 and the insulating block 4 are both received in the outer cover 1.

Referring to FIG. 11 to FIG. 14, each conductive terminal 3 includes a first extension portion 31, a mating portion 32 connected to the first extension portion 31, a turning portion 33 connected to the mating portion 32, a curved portion 34 connected to the first extension portion 31, a second extension portion 35 connected to the curved portion 34, and a tail portion 36 bent from the second extension portion 35.

In the embodiment shown in the present disclosure, the mating portion 32 is in an arc shape, so as to achieve better contact with a mating terminal 201 of the mating connector 200. The mating portion 32 includes a first end 321 and a second end 322. In the embodiment shown in the present disclosure, the first end 321 is located at a bottom of the second end 322. The first extension portion 31 is connected to the first end 321. The turning portion 33 is connected to the second end 322. The mating portion 32 extends into the receiving space 120 along the mating direction N to abut against the mating terminal 201 of the mating connector 200. The curved portion 34 is deformable along the first direction C1-C1 parallel to the mating direction N, so as to provide the mating portion 32 with a contact force for abutting against the mating terminal 201.

In the embodiment shown in the present disclosure, the turning portion 33 extends in a direction opposite to the mating direction N. The turning portion 33 includes a straight portion 331 parallel to the first extension portion 31 and a hook portion 332 bent from one end of the straight portion 331 away from the mating portion 32 in a direction away from the first extension portion 31. The first extension portion 31 and the straight portion 331 are spaced apart along a second direction C2-C2 perpendicular to the first direction C1-C1. Referring to FIG. 14, the hook portion 332 is used for hooking on an inner wall surface of the protruding portion 22 of the insulating body 2, so as to play a role of positioning and limiting, and prevent excessive deformation of the conductive terminal 3.

In the illustrated embodiment of the present disclosure, the curved portion 34, the first extension portion 31, the mating portion 32 and the turning portion 33 protrude beyond the insulating block 4 in a cantilevered manner, so as to provide better elastic deformation ability. Referring to FIG. 13 and FIG. 14, after the electrical connector 100 is assembled, the mating portion 32 does not extend beyond the mating surface 125. In other words, the mating portion 32 is located inside the mating surface 125. The protrusion 12 can protect the mating portion 32 and prevent the mating portion 32 from being damaged by external force.

The curved portion 34 has at least one deformable curved structure along the first direction C1-C1 parallel to the mating direction N. The deformable curved structure is configured to provide elastic force to the mating portion 32. In the illustrated embodiment of the present disclosure, the curved portion 34 includes two deformable curved structures in an S-shape. The two deformable curved structures include a first U-shaped portion 341 connected to the first extension portion 31 and a second U-shaped portion 342 connected to the first U-shaped portion 341. The first U-shaped portion 341 includes a first opening 3410. The second U-shaped portion 342 includes a second opening 3420. An opening direction of the first opening 3410 and an opening direction of the second opening 3420 are opposite to each other. Of course, in other embodiments, the curved portion 34 may also have other shapes, such as a shape connected by several S-shaped curved portions. In the embodiment shown in the present disclosure, an opening depth D1 of the first opening 3410 along the second direction C2-C2 is smaller than an opening depth D2 of the second opening 3420 along the second direction C2-C2. It is understandable to those skilled in the art that by providing the curved portion 34 in the present disclosure, the curved portion 34 can be deformed along the first direction C1-C1 parallel to the mating direction N, so as to provide the mating portion 32 with a contact force for abutting against the mating terminal 201. Compared with the Pogo terminal, the conductive terminal 3 of the present disclosure has a simpler structure, higher stability and lower cost.

The second extension portion 35 is straight and fixed in the insulating block 4. The tail portion 36 is formed by bending downward from a rear end of the second extension portion 35 and extending backward. Referring to FIG. 14, the tail portion 36 is used for soldering and fixing to the adapter circuit board 5.

The plurality of conductive terminals 3 are symmetrically arranged along the central plane M-M, wherein the conductive terminals 3 symmetrically located on opposite sides of the central plane M-M have a same function.

Figure 2:
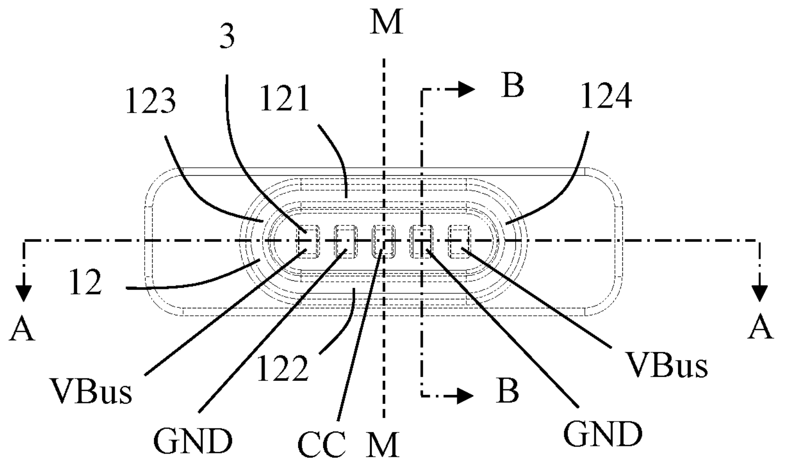
FIG. 2 is a front view of FIG. 1.
Figure 3:
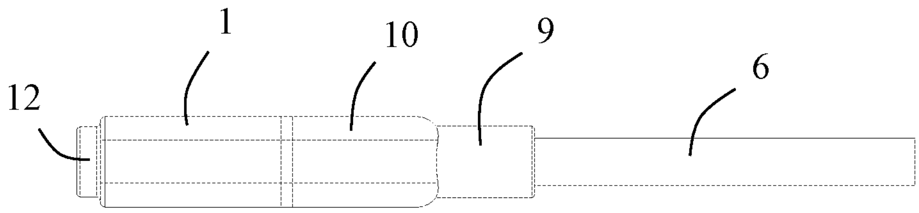
FIG. 3 is a right side view of FIG. 1.
Figure 4:
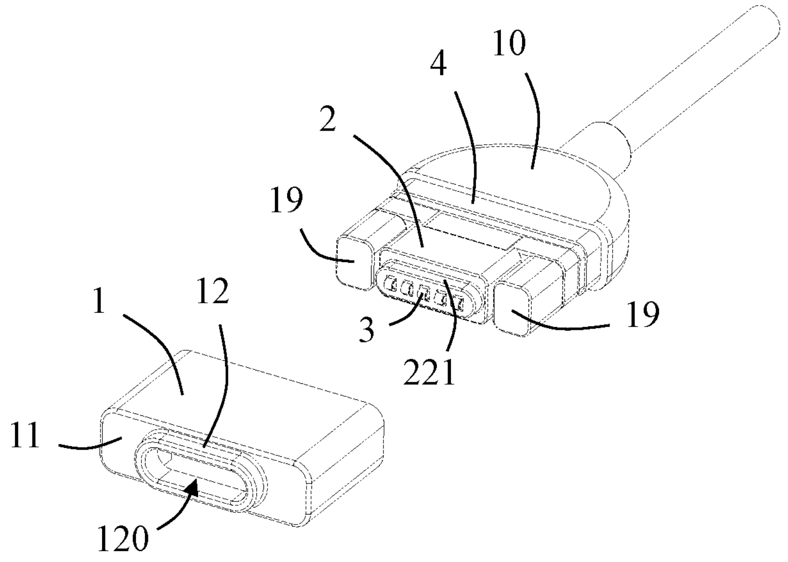
FIG. 4 is a partially exploded perspective view of FIG. 1.

Specifically, referring to FIG. 2, in the embodiment shown in the present disclosure, five conductive terminals 3 are provided. The conductive terminal 3 in the middle is a CC terminal. Two conductive terminals 3 adjacent to the CC terminal and located on opposite sides of the CC terminal are ground terminals GND. Two conductive terminals 3 adjacent to the ground terminals GND and located on opposite sides of the ground terminals GND are power terminals VBus. This design can realize positive and negative insertion in the function of the conductive terminal 3, that is, no matter when the electrical connector 100 is facing upwardly or downwardly, it can be electrically connected to the mating connector 200. Of course, it is understandable to those skilled in the art that the number of the plurality of conductive terminals 3 is not limited to five. The number of the plurality of conductive terminals 3 can be odd or even, which can be flexibly adjusted according to actual needs. For example, according to the increase of the transmission power, the number of the plurality of conductive terminals 3 can be appropriately increased.

The adapter circuit board 5 is used to electrically connect the plurality of conductive terminals 3 and the cable 6. According to requirements, the plurality of conductive terminals 3 and the cable 6 can be soldered on a same side or different sides of the adapter circuit board 5. Of course, a part of the cable 6 can also be soldered on one side of the adapter circuit board 5, while another part of the cable 6 can be soldered on the other side of the adapter circuit board 5. These modified embodiments are understandable to those skilled in the art, which will not be repeated in the present disclosure. The adapter circuit board 5 is provided with a pair of positioning slots 51. A front end of each positioning slot 51 is matched with a corresponding positioning tab 43 to play a role of assembling and positioning. The electrical connector 100 further includes an insertion pin 18 inserted into a rear end of the corresponding positioning slot 51 along a top-bottom direction.

The ring 8 is sleeved on the cable 6 to fix inner wires and/or realize grounding.

The stress relief block 9 is sleeved on the cable 6 to relieve stress. In the illustrated embodiment of the present disclosure, the stress relief block 9 is an independent element and is mounted on the cable 6. Of course, in other embodiments, the stress relief block 9 can also be over-molded on the cable 6. In some other embodiments, the stress relief block 9 may be integrally formed with the over-molding housing 10.

The over-molding housing 10 is over-molded on the over-molding block 7 and combined with the outer cover 1 as a whole.

In the embodiment shown in the present disclosure, an outer surface of the electrical connector 100 has a straight surface and rounded corners along the top-bottom direction. Of course, in other embodiments, the outer surface of the electrical connector 100 may also adopt a fully rounded structure or a curved structure. The over-molding housing 10 can also be replaced by a metal or plastic housing, in which case the housing can be combined with the over-molding block 7 and connected with the outer cover 1 by means of assembly or the like.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an outer cover comprising a mating surface; and a plurality of conductive terminals, each conductive terminal comprising a first extension portion, a second extension portion, and a mating portion connected to the first extension portion, the mating portion extending toward the mating surface along a mating direction;

wherein each conductive terminal comprises a curved portion connected between the first extension portion and the second extension portion, the curved portion has at least one deformable curved structure along a first direction parallel to the mating direction, and the deformable curved structure is configured to provide elastic force to the mating portion;

wherein the curved portion comprises at least one U-shaped portion; and wherein the mating portion, the first extension portion and the at least one U-shaped portion are disposed in sequence along a direction opposite to the mating direction; and the at least one U-shaped portion is configured to be compressible along the direction opposite to the mating direction so as to provide the elastic force to the mating portion.

2. The electrical connector according to claim 1, wherein the mating portion is in an arc shape, the mating portion comprises a first end and a second end, the first extension portion is connected to the first end, each conductive terminal further comprises a turning portion connected to the second end, and the turning portion extends in the direction opposite to the mating direction.

3. The electrical connector according to claim 2, wherein the turning portion comprises a straight portion parallel to the first extension portion, and the first extension portion and the straight portion are arranged at intervals along a second direction perpendicular to the first direction.

4. The electrical connector according to claim 3, wherein the turning portion comprises a hook portion bent from one end of the straight portion away from the mating portion in a direction away from the first extension portion.

5. The electrical connector according to claim 1, wherein the outer cover comprises an end surface and a protrusion protruding beyond the end surface, the protrusion is provided with the mating surface and a receiving space extending through the mating surface, and the mating portion extends into the receiving space.

6. The electrical connector according to claim 5, wherein the mating portion does not extend beyond the mating surface.

7. The electrical connector according to claim 1, wherein the at least one U-shaped portion comprises two deformable curved structures in an S-shape, the two deformable curved structures comprise a first U-shaped portion connected to the first extension portion and a second U-shaped portion connected to the first U-shaped portion; and wherein the first U-shaped portion comprises a first opening, the second U-shaped portion comprises a second opening, and an opening direction of the first opening and an opening direction of the second opening are opposite to each other.

8. The electrical connector according to claim 7, wherein an opening depth of the first opening along a second direction perpendicular to the first direction is smaller than an opening depth of the second opening along the second direction.

9. The electrical connector according to claim 1, further comprising an adapter circuit board and a cable; wherein the plurality of conductive terminals and the cable are electrically connected to the adapter circuit board, respectively.

10. The electrical connector according to claim 1, further comprising at least one magnetic attraction element mounted in the outer cover.

11. The electrical connector according to claim 1, wherein the plurality of conductive terminals are symmetrically arranged along a central plane; and wherein the conductive terminals symmetrically located on opposite sides of the central plane have a same function.

12. An electrical connector, comprising:

an outer cover comprising a mating surface; and a plurality of conductive terminals, each conductive terminal comprising a first extension portion, a second extension portion, and a mating portion connected to the first extension portion, the mating portion extending toward the mating surface along a mating direction;

wherein each conductive terminal comprises a curved portion connected between the first extension portion and the second extension portion, the curved portion has at least one deformable curved structure along a first direction parallel to the mating direction, and the deformable curved structure is configured to provide elastic force to the mating portion;

the electrical connector further comprises an insulating block fixing the plurality of conductive terminals; wherein the curved portion, the first extension portion and the mating portion protrude beyond the insulating block in a cantilevered manner.

13. The electrical connector according to claim 12, further comprising an insulating body provided with at least one locking hole, the insulating block comprising at least one locking arm locked with the at least one locking hole, the insulating body and the insulating block being received in the outer cover.

14. The electrical connector according to claim 13, wherein the insulating body comprises a base portion and a protruding portion protruding from the base portion, a pair of the locking holes are provided on the base portion, and the pair of the locking holes are located on opposite sides of the protruding portion.

15. The electrical connector according to claim 12, further comprising an insulating body, the insulating body and the insulating block being received in the outer cover, the insulating body comprising a base portion and a protruding portion protruding from the base portion, the protruding portion comprising a receiving cavity and a boss portion protruding along the mating direction, the boss portion comprising a front end surface and a plurality of terminal receiving grooves extending through the front end surface, the plurality of terminal receiving grooves being in communication with the receiving cavity, the plurality of conductive terminals being received in the receiving cavity and extend through corresponding terminal receiving grooves.

16. The electrical connector according to claim 15, wherein the plurality of terminal receiving grooves are arranged at intervals along a direction perpendicular to the mating direction.

17. The electrical connector according to claim 15, further comprising a magnetic attraction element mounted in the outer cover; wherein the magnetic attraction element is located on one side of the protruding portion, and the magnetic attraction element is located between the base portion and an end surface of the outer cover along the first direction.

18. The electrical connector according to claim 12, further comprising an over-molding block over-molded on the insulating block and an over-molding housing over-molded on the over-molding block.

19. An electrical connector, comprising:

an outer cover comprising a mating surface;

a plurality of conductive terminals, each conductive terminal comprising a first extension portion, a second extension portion, a mating portion connected to the first extension portion, and a tail portion, the mating portion extending toward the mating surface along a mating direction;

an adapter circuit board, the tail portion of each conductive terminal being electrically connected with the adapter circuit board; and a cable electrically connected with the adapter circuit board;

wherein each conductive terminal comprises a curved portion connected between the first extension portion and the second extension portion, the curved portion has at least one deformable curved structure along a first direction parallel to the mating direction, and the deformable curved structure is configured to provide elastic force to the mating portion.

20. The electrical connector according to claim 19, wherein the curved portion comprises two deformable curved structures in an S-shape, the two deformable curved structures comprise a first U-shaped portion connected to the first extension portion and a second U-shaped portion connected to the first U-shaped portion; and wherein the first U-shaped portion comprises a first opening, the second U-shaped portion comprises a second opening, and an opening direction of the first opening and an opening direction of the second opening are opposite to each other; and wherein an opening depth of the first opening along a second direction perpendicular to the first direction is smaller than an opening depth of the second opening along the second direction.

* * * * *